United States Patent
Hull et al.

(10) Patent No.: US 9,729,025 B2
(45) Date of Patent: Aug. 8, 2017

(54) OPEN-CORE FLYWHEEL ARCHITECTURE

(75) Inventors: John R. Hull, Sammamish, WA (US); Michael Strasik, Sammamish, WA (US); John A. Mittleider, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 224 days.

(21) Appl. No.: 13/438,129

(22) Filed: Apr. 3, 2012

(65) Prior Publication Data

US 2013/0260999 A1  Oct. 3, 2013

(51) Int. Cl.
| | |
|---|---|
| *H02K 7/02* | (2006.01) |
| *H02K 7/09* | (2006.01) |
| *F16C 32/04* | (2006.01) |
| *F16F 15/315* | (2006.01) |
| *F16F 15/305* | (2006.01) |

(52) U.S. Cl.
CPC ......... *H02K 7/025* (2013.01); *F16C 32/0417* (2013.01); *F16C 32/0438* (2013.01); *F16F 15/305* (2013.01); *F16F 15/3156* (2013.01); *H02K 7/09* (2013.01); *F16C 32/0423* (2013.01); *F16C 2361/55* (2013.01); *Y02E 60/16* (2013.01)

(58) Field of Classification Search
CPC  F16C 32/041; F16C 32/0417; F16C 32/0419; F16C 2361/55; F16C 32/0423; H02K 7/02; H02K 7/025; F16F 15/305; F16F 15/3156
USPC ........ 310/74, 90.5; 74/572.1, 572.11, 572.12
See application file for complete search history.

(56) References Cited

U.S. PATENT DOCUMENTS

| | | | | |
|---|---|---|---|---|
| 3,888,553 | A | * | 6/1975 | Wehde .......................... 310/90.5 |
| 3,955,858 | A | * | 5/1976 | Poubeau ................ B64G 1/283 244/166 |
| 5,015,940 | A | * | 5/1991 | Lois .................................. 322/4 |
| 5,017,819 | A | * | 5/1991 | Patt ........................ F02G 1/0435 310/12.21 |
| 5,214,981 | A | | 6/1993 | Weinberger et al. |
| 5,298,826 | A | * | 3/1994 | Lee et al. ................. 310/156.09 |
| 5,495,221 | A | * | 2/1996 | Post .............................. 335/299 |
| 5,721,459 | A | * | 2/1998 | Rao et al. ....................... 310/74 |

(Continued)

FOREIGN PATENT DOCUMENTS

| | | |
|---|---|---|
| CN | 1158674 A | 9/1997 |
| CN | 101409478 A | 4/2009 |

(Continued)

OTHER PUBLICATIONS

Kirk et al., "The Open Core Composite Flywheel"; Energy Conversion Engineering Conference, vol. 3, 1997, pp. 1748-1753.*

(Continued)

*Primary Examiner* — Burton Mullins
(74) *Attorney, Agent, or Firm* — Coats & Bennett, PLLC (57) ABSTRACT

Apparatuses, systems and methods are described for a flywheel system incorporating a rotor made from a high-strength material in an open-core flywheel architecture with a high-temperature superconductive (HTS) bearing technology to achieve the desired high energy density in the flywheel energy storage devices, to obtain superior results and performance, and that eliminates the material growth-matching problem and obviates radial growth and bending mode issues that otherwise occur at various high frequencies and speeds.

9 Claims, 8 Drawing Sheets

(56) References Cited

U.S. PATENT DOCUMENTS

| | | | |
|---|---|---|---|
| 5,760,506 A | 6/1998 | Ahlstrom et al. | |
| 5,831,362 A * | 11/1998 | Chu et al. | 310/90.5 |
| 5,912,519 A | 6/1999 | Horner et al. | |
| 6,570,286 B1 * | 5/2003 | Gabrys | F16C 32/0478 |
| | | | 310/90.5 |
| 6,707,187 B1 * | 3/2004 | Gabrys | H02K 7/025 |
| | | | 310/74 |
| 6,710,489 B1 * | 3/2004 | Gabrys | H02K 7/025 |
| | | | 310/74 |
| 6,873,235 B2 | 3/2005 | Fiske et al. | |
| 2010/0203351 A1 * | 8/2010 | Nayfeh | 428/622 |
| 2010/0231075 A1 | 9/2010 | Han et al. | |
| 2010/0282528 A1 * | 11/2010 | Palti | 180/65.1 |
| 2012/0060644 A1 | 3/2012 | Morgan et al. | |
| 2012/0175985 A1 * | 7/2012 | Post | 310/90.5 |

FOREIGN PATENT DOCUMENTS

| | | | |
|---|---|---|---|
| CN | 201352737 Y | 11/2009 | |
| JP | 62-30565 | * 2/1987 | B04B 9/12 |
| JP | 01-219391 | * 9/1989 | F04D 19/04 |
| JP | 06-333332 | * 12/1994 | G11B 19/20 |
| JP | 3554070 | * 4/1995 | F16C 32/0417 |
| JP | H10507809 A | 7/1998 | |
| JP | H11355980 A | 12/1999 | |
| JP | 2010159773 A | 7/2010 | |
| WO | 9608831 | 3/1996 | |

OTHER PUBLICATIONS

T.Mulcahy et al. "Test Results of 2-kWh Flywheel Usiing Passive PM and HTS Bearings" IEEE Transactions on Applied Superconductivity, vol. 11, No. 1, pp. 1729-1732, Mar. 2001.*

M.Strasik et al. "Design, Fabrication and Test of a 5-kWh/100-kW Flywheel Energy Storage Utilizing a High-Temperture Superconducting Bearing" IEEE Transactions on Applied Superconductivity, vol. 17, No. 2, pp. 2133-2137, Jun. 2007.*

G.Goncalves et al., "Magnetic Bearing Sets for a Flywheel System", vol. 17, No. 2, pp. 2150-2153, Jun. 2007.*

R de Andrade et al. "Flywheel Energy Storage System Description and Tests", IEEE Transactions on Applied Superconductivity, vol. 17, No. 2, pp. 2154-2157, Jun. 2007.*

Ashley S. et al. "Designing Safer Flywheels," Mechanical Engineering, 1996, vol. 118, No. 11, pp. 88-91.

Barber, A.H. et al., "Stochastic Strength of Nanotubes: An Appraisal of Available Data," Composites Science and Technology, 2005, vol. 65, pp. 2380-2384.

Basinger, S.A., et. al. "Amplitude-Dependence of Magnetic Stiffness in Bulk High-Temperature Superconductors," Appl. Phys. Lett., 1990, vol. 57, pp. 2942-2944.

Bradford, P.D., et al., "A Novel Approach to Fabricate High Volume Fraction Nanocomposites With Long Aligned Carbon Nanotubes," Compo Sci. Technol., 2010, vol. 70, pp. 1980-19.

Chae, H.G., et al., "Stabilization and Carbonization of Gel Spun Polyacryolonitrile/Single Wall Carbon Nanotube Composite Fibers," Polymer, 2007, vol. 48, pp. 3781-3789.

Chae, H.G., et al., "Making strong fibers," Science, 2008, vol. 319, pp. 908-909.

Coleman, J.N., et al., "Small But Strong: A Review of the Mechanical Properties of Carbon Nanotube-Polymer Composites," Carbon, 2006, vol. 44, pp. 1624-1652.

Cumings, J. and Zettl, A., "Low-Friction Nanoscale Linear Bearings From Multiwall Carbon Nanotubes," Science, 2000, vol. 289, pp. 602-604.

Dumitrica, T., et al., "Selective Cap Opening in Carbon Nanotubes Driven by Laser-Induced Coherent Phonons," Physical Review Letters, 2004, vol. 92, No. 11.

Zhang, X., et al., "Ultrastrong, Stiff, and Lightweight Carbon-Nanotube Fibers," 2007, Adv. Mater., vol. 19, pp. 4198-4201.

Zhang, Y., et al., "Tailoring the Morphology of Carbon Nanotube Arrays: From Spinnable Forests to Undulating Foams," 2009, ACSNano, vol. 3, pp. 2157-2162.

Zhang, Y., et al., "Polymer-Embedded Carbon Nanotube Ribbons for Stretchable Conductors," 2010, Adv. Mater., vol. 22, pp. 3027-3031.

Zhao, H., et al., "Carbon Nanotube Yarn Strain Sensors," 2010, Nanotechnology, vol. 21, 305502.

Huhtala, M., et al., "Improved Mechanical Load Transfer Between Shells of Multiwalled Carbon Nanotubes," Physical Review B, 2004, vol. 70, 045404.

Hull, J.R., et al., "Velocity Dependence of Rotational Loss in Evershed-Type Superconducting Bearings," Appl. Phys. Lett., 1997, vol. 70, pp. 655-657.

Hull, J.R. "Superconducting Levitation," Encyclopedia of Electrical and Electronics Engineering, 1999, vol. 20, pp. 729-734 (ed. J. G. Webster), John Wiley and Sons, New York.

J. Hull, "Superconducting Bearings," Supercond. Sci. Technol., 2000, vol. 13, pp. R1-R14.

Hull, J.R. and Murakami, M., "Applications of Bulk High-Temperature Superconductors," Proceedings IEEE, 2004, vol. 92, pp. 1705-1718.

Hull, J., et al., "High Rotational-Rate Rotors With High-Temperature Superconducting Bearings," IEEE Trans. Appl. Supercond., 2009, vol. 19, pp. 2078-2082.

Jia, J., et al., "A Comparison of the Mechanical Properties of Fibers Spun From Different Carbons Nanotubes," Carbon, 2011, vol. 49, pp. 1333-1339.

Jiang, B., et al., "Maximum Nanotube Volume Fraction and Its Effect on Overall Elastic Properties of Nanotube-Reinforced Composites," Composites: Part B, 2009, vol. 40, pp. 21.

Mora, R.J., et al., "Properties of Composites of Carbon Nanotube Fibres," Composites Science and Technology, 2009, vol. 69, pp. 1558-1563.

Mulcahy, T.M., et al., "Test Results of 2-kWh Flywheel Using Passive PM and HTS Bearings," IEEE Trans. Appl. Supercond., 2001, vol. 11, pp. 1729-1732.

Pantano, A., et al., "Mechanics of Deformation of Single- and Multi-Wall Carbon Nanotubes," J. Mechanics and Physics of Solids, 2004, vol. 52, pp. 789-821.

Pathak, S.K., et al., "Fabrication of High Performance Y-123/Y-24111/Ag Single Grain Composites," Physica C, 2009, vol. 469, pp. 1173-1176.

Pathak, S.K., et al., "Processing and Properties of Large Grain Y—Ba—Cu—O Containing Y2Ba4CuWOY (Y-24W1) and Ag Second Phase Inclusions," J. Appl. Phys., 2009, vol. 106, 06392.

Sammalkorpi, M., et al., "Mechanical Properties of Carbon Nanotubes With Vacancies and Related Defects," Physical Review B, 2009, vol. 70, 245416.

Shokrieh, M.M. And Rafiee, R., "Investigation of Nanotube Length Effect on the Reinforcement Efficiency in Carbon Nanotu," Composite Structures, 2010, vol. 92, pp. 2415-2420.

Strasik, M., et al., "Design, . . . Flywheel Energy Storage Utilizing a . . . Superconducting Bearing," IEEE Trans. Appl. Supercond. Sci Technonol., 2007, vol. 17, pp. 2133-2137.

Strasik, M., et al., "Performance of a Conduction-Cooled High-Temperature Superconducting Bearing," Mat. Sci. Eng. B, 2008, vol. 151, pp. 195-198.

Strasik, M., et al., "Overview of Boeing Flywheel Energy-Storage Systems With High-Temperature Superconducting Bearings," Supercond. Sci. Technol., 2010, vol. 23, 034021.

Strubhar, J.L., et al., "Lightweight Containment for High-Energy Rotating Machines," IEEE Trans. Magn., 2003, vol. 39, pp. 378-383.

Svřcek, V., et al., "Filling and Capping Multiwall Carbon Nanotubes With Silicon Nanocrystals Dispersed in SiO2-Based Spin on Glass," J. Appl. Phys., 2006, vol. 99 064306.

Unger, R. and Keiter, D., "The Development of Cryotel™ Family of Coolers," AIP Conf. Proc. 2004, vol. 719, pp. 1404-1409.

Wardle, B.L., et al., "Fabrication and Characterization of Ultrahigh-Volume-Fraction Aligned Carbon Nanotube-Polymer Composites," Adv. Mater., 2008, vol. 20, pp. 2707-2714.

(56) References Cited

OTHER PUBLICATIONS

Wei, C., et al., "Tensile Strength of Carbon Nanotubes Under Realistic Temperature and Strain Rate," Physical Review B, 2003, vol. 67, 115407.
Weinberger, B.R., et al., "Low Friction in High Temperature Superconductor Bearings," Appl. Phys. Lett., 1991, vol. 59, pp. 1132-1134.
Yakobson, B.I., et al., "High Strain Rate Fracture and C-Chain Unraveling in Carbon Nanotubes," Computational Materials Science, 1997, vol. 8 pp. 341-348.
Yu, M., et al., "Strength and Breaking Mechanism of Multiwalled Carbon Nanotubes Under Tensile Load," Science, 2000, vol. 287, p. 637.
Yu, M., et al., "Controlled Sliding and Pullout of Nested Shells in Individual Multiwalled Carbon Nanotubes," J Phys. Chem. B, 2000, vol. 104, pp. 8764-8767.
JPO Office Action dated Apr. 4, 2017 for Application No. JP2013-075845 (translation).

\* cited by examiner

OPEN-CORE FLYWHEEL ARCHITECTURE

TECHNOLOGICAL FIELD

The present disclosure relates to flywheel energy storage devices and, more particularly, to hubless, or open-core flywheel storage devices having improved stability and performance.

BACKGROUND

Flywheel energy storage devices and systems are known for storing energy and releasing stored energy on demand. Known flywheel assemblies have a traditional rotor design sometimes made with carbon fiber composites. Such rotors have a shaft on which the motor/generator (M/G) and bearing permanent magnets (PMs) are mounted. The shaft is conventionally connected to the rim via a hub. The shaft-and-hub flywheel design is limited in terms of its achievable upper-end velocity. Matching useable materials for components in the flywheel assembly has been problematic since the radial growth of the components varies as the rotor velocity increases. The hub must mechanically couple the shaft to the rim without introducing bending modes into the rotor structure through the range of operating frequencies in the operating speed range of the flywheel. However, the shaft often exhibits negligible radial growth while the rim exhibits significant radial growth. This imbalance in component growth during flywheel operation restricts flywheel performance and can lead to flywheel system failure.

BRIEF SUMMARY

The present disclosure is directed to a flywheel and flywheel architecture that eliminates the material growth-matching problem and obviates radial growth and bending mode issues that otherwise occur at various frequencies and speeds. More specifically, disclosed herein are flywheel assemblies having an "open-core" (hubless) architecture as opposed to a shaft-and hub architecture.

The present disclosure is directed to a novel open-core flywheel energy storage system that will obtain high energy, high power-density and efficiency, while having a significantly reduced size profile. The flywheel storage systems of the present disclosure comprise high-temperature superconducting (HTS) bearings and rotors comprising high-strength materials. Preferred high-strength materials include but are not limited to carbon fiber-containing materials, glass fiber-containing materials, metal-containing materials, etc. and combinations thereof.

The desired properties inherent in the fabricated rotors of the present disclosure result in significantly improved flywheel performance in terms of significantly increased speed, increased power storage/generation and increased system durability.

Still further, disclosures are directed to a flywheel assembly for storing and releasing energy comprising a hollow substantially cylindrical rotor assembly having a rotor having an inner and outer surface. The rotor comprises a material preferably having a preferred tensile strength of from about 2 GPa to about 20 GPa. A stator assembly is positioned in close proximity with the rotor assembly with at least one flexible rotor magnet affixed to the inner surface of the rotor and at least one stator magnet affixed to the stator. The flexible rotor magnet preferably comprises FeBNd powder. The stator magnets have an attractive force value at rest and are dimensioned to a predetermined width to substantially maintain the attractive force value with the rotor when the rotor is operating at circumferential velocities of from about 300 m/s to about 3000 m/s. The rotor magnets and stator magnets are positioned relative to one another to facilitate levitation of the rotor during operation. The flywheel architecture is preferably an open-core architecture, wherein the rotor preferably achieves a velocity at its outer radius of from about 300 m/s to about 3000 m/s during operation.

Still further, variations are directed to a method for storing energy for subsequent release upon demand comprising the steps of providing a hollow substantially cylindrical rotor assembly comprising a rotor having an inner and outer surface. The rotor comprises a carbon-fiber-containing, glass-fiber-containing or metal-containing material (or a combination thereof) with the material having a tensile strength of from about 2 GPa to about 20 GPa. A stator assembly is provided and positioned in close proximity with the rotor assembly, preferably in an open-core architecture. At least one flexible rotor magnet is affixed to the inner surface of the rotor and the stator and rotor are positioned relative to one another to facilitate levitation of the rotor during operation. Preferably, the rotor achieves a circumferential velocity at its outer radius of from about 300 m/s to about 3000 m/s during operation. The carbon-fiber-containing, glass-fiber-containing or metal-containing material preferably comprises a matrix of materials selected from the group consisting of graphite, E-glass, S-glass, silica, aluminum, titanium, steel and combinations thereof. One particularly preferred material is a carbon nanotube-containing material, and is preferably a single-walled carbon nanotube-containing material.

In preferred variations, the flywheel assemblies have particular usefulness as a sustainable power source for use in stationary applications and mobile applications such as, for example, manned and unmanned vehicles, including aircraft, spacecraft and terrestrial and surface and subsurface water-borne vehicles, etc.

BRIEF DESCRIPTION OF THE DRAWING(S)

Having thus described variations of the disclosure in general terms, reference will now be made to the accompanying drawings, which are not necessarily drawn to scale, and wherein:

DETAILED DESCRIPTION

According to the present disclosure, there are several key technologies that are incorporated into the open-core flywheel architecture to achieve the desired high energy density in the flywheel energy storage devices to obtain superior results and performance. Such advances include incorporating rotors made from high-strength materials, and incorporating a rotor in an open-core (hubless) flywheel architecture with a high-temperature superconductive (HTS) bearing technology.

Carbon nanotubes (CNTs) are allotropes of carbon with a cylindrical nanostructure. Nanotubes have been constructed with length-to-diameter ratio of up to 132,000,000:1, significantly larger than for any other material. These cylindrical carbon molecules have unusual properties that are valuable for nanotechnology, electronics, optics and other fields of material science and technology. Because of their thermal conductivity and mechanical and electrical properties, carbon nanotubes find applications as additives to various structural materials. Nanotubes are categorized as single-walled nanotubes (SWNTs) and multi-walled nanotubes (MWNTs). Individual nanotubes naturally align themselves into "ropes" held together by van der Waals forces, more specifically, pi-stacking.

CNTs are among the strongest and stiffest materials yet discovered in terms of tensile strength and elastic modulus. This strength results from the covalent $sp^2$ bonds formed between the individual carbon atoms. MWCNTs were tested to have tensile strength of about 63 gigapascals (GPa). For illustration, this translates into the ability to endure tension of a weight equivalent to 6422 kg on a cable with a cross-section of 1 $mm^2$. Individual CNT shells have a strength of up to about 100 GPa. Since CNTs have a low density for a solid of from about 1.3 to about 1.4 $g/cm^3$, their specific strength of up to about 48,000 $kN·m·kg^{-1}$ is the best of known materials, compared to, for example, high-strength carbon steel having a specific strength of about 154 $kN·m·kg^{-1}$.

Although the strength of individual CNT shells is extremely high, weak shear interactions between adjacent shells and tubes leads to significant reductions in the effective strength of multi-walled carbon nanotubes and carbon nanotube bundles down to only a few GPa's. However, applying high-energy electron irradiation, which crosslinks inner shells and tubes, effectively increases the strength of these materials to about 60 GPa for multi-walled carbon nanotubes and about 17 GPa for double-walled carbon nanotube bundles.

Standard single-walled carbon nanotubes (SWCNTs) can withstand a pressure up to about 24 GPa without deformation. They then undergo a transformation to superhard phase nanotubes. Maximum pressures measured using current experimental techniques are about 55 GPa. However, these new superhard phase nanotubes collapse at an even higher, albeit unknown, pressure.

Multi-walled carbon nanotubes (MWCNTs) are multiple concentric nanotubes precisely nested within one another. These CNTs exhibit a striking telescoping property whereby an inner nanotube core may slide, almost without friction, within its outer nanotube shell, thus creating an atomically perfect linear or rotational bearing.

According to the present disclosure, CNTs are used directly in the manufacture of the composite rotors. MWCNT yarns having a density of about 0.2 $gm/cm^3$ are believed to yield a conservative minimal material strength of at least about 45 GPa, for twist-free composite structures.

The preferred CNTs for use in the fabrication of the novel rotors of the present disclosure preferably have a wall thickness of about 0.075 nm and an effective wall thickness of about 0.34 nm with a physical wall strength of from about 150 to about 260 GPa. This provides a preferred material having volume fractions of up to about 65% of 30 nm diameter MWCNTs with metallic, glassy and/or polymeric matrices. Inducing defects into the MWCNTs is believed to improve inter-wall strength to improve mechanical load transfer between the MWCNT strands to inner strand "walls" by a factor of about 2.

The preferred CNTs used in the present disclosure are specifically formulated by controlling the degree of orientation and volume fraction in a matrix to afford the finished composite material and product desired physical properties (such as, for example, higher rotor tensile strengths) than are presently known.

In addition, ceramic-type magnets have been used in flywheel assemblies have not been practical at higher rotational speeds (circumferential velocities) due to their inherent characteristics including, but not limited to, their brittleness, for example. Therefore, as rotational flywheel speeds increase, various magnet types are needed. Known ceramic magnets are generally limited to circumferential velocities of less than about 300 m/s. The present disclosure contemplates incorporating flexible magnets having desirable properties, including their ability to expand as the rotor material itself expands in operation at very high speeds. Preferred flexible magnets comprise FeBNd powder.

Some variations of the present disclosure will now be described more fully hereinafter with reference to the accompanying drawings, in which some, but not all variations of the disclosure are shown. Indeed, the present disclosure may be embodied in many different forms and should not be construed as limited to the variations set forth herein. Instead, these illustrative variations are provided so that this disclosure will be thorough and complete, and will fully convey the scope of the disclosure to those skilled in the art. For example, unless otherwise indicated, referencing something as being a first, second or the like should not be construed to imply a particular order. Also, something may be described as being "above" something else and, unless otherwise indicated, may instead be "below", and vice versa. Similarly, something described as being to the left of something else may instead be to the right, and vice versa. Like reference numerals refer to like elements throughout.

Figure 1A:
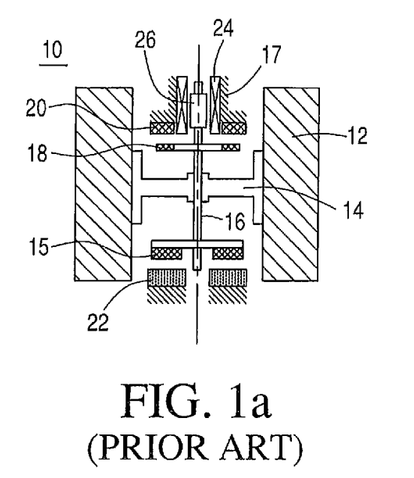
FIG. 1(a) is a cross-sectional view of a prior art shaft-and-hub flywheel assembly.

FIG. 1(a) shows a cross-sectional view of a traditional shaft-and-hub flywheel assembly 10 that displays limited performance at, for example, various frequencies and higher speeds. A fiber-composite rim rotor 12 is attached to hub 14 that, in turn, is attached to shaft 16. Sintered permanent magnets (PMs) 15 and 18 exert attractive and repulsive forces on a lift PM 20 and a high temperature superconductor 22 that are attached to shaft 16. PM 20 is shown attached to support 17. A stator coil 24 from the motor/generator (M/G) is shown suspended between the M/G PM 26 and support 17.

Figure 1B:
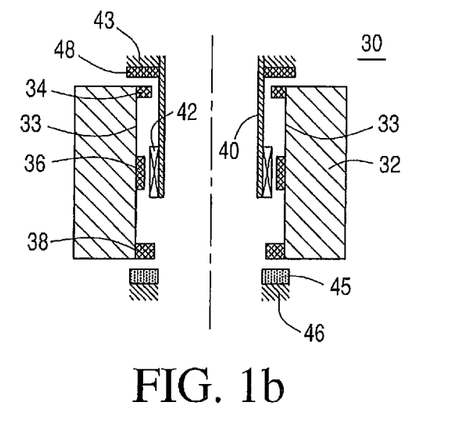
FIG. 1(b) is a cross-sectional view of an open-core flywheel assembly.

FIG. 1(b) shows a cross-sectional view of a flywheel architecture 30 made according to the present disclosure. In this "hubless" open-core flywheel architecture (with dot-dashed line indicating a centerline), elastic permanent magnets (PMs) 34, 36 and 38 are shown affixed to a fiber-composite rim rotor 32. Lift bearing stator PM 48 and stator coil 42 from the motor/generator (M/G) are attached to support structure 43. High temperature superconductor (HTS) 45 is positioned proximate to support 46. PMs 48 and 34 comprise the lift bearing, and elements 45 and 38 comprise the stability bearing.

The open-core architecture of the present disclosure presents a novel design that enables the fiber-composite rim and the HTS bearing to achieve maximum performance without the design limitations of component radial growth disparities inherent in the shaft-and-hub flywheel design. It is understood that the entire open-core flywheel 30 in its shown vertical orientation, is contained within a vacuum chamber (not shown). In a preferred vertical orientation, the ring-shaped rotor 32 is preferably suspended by a passively stable magnetic bearing comprising a lift bearing PM 48 and 34 at one end or "top" and a HTS stability bearing 45 and 38 at a second end, or "bottom". Preferably, a brushless PM motor/generator 36 and 42 delivers power in and out of the rotor. As shown in FIG. 1(b), the rotor PMs 34, 36 and 38 are positioned along the inner surface 33 of the rotor 32. According to the present disclosure, these PMs must be sufficiently flexible to accommodate the radial growth or, "dimensional expansion", of the flywheel without breaking or otherwise compromising structural integrity or performance. As such, the PMs desirably have a relative low Young's modulus in the range of from about 0.01 MPa to about 2 MPa. An example materials for these magnets include those comprising FeBNd powder dispersed in rubber. The coldhead of a small cryocooler (not shown) thermally conducts to the HTS stability bearing 45 to maintain a desired temperature of from about 30 K to about 90 K, and preferably about 60 K. A small turbo-molecular or getter-sublimation pump (not shown) maintains the vacuum inside the chamber.

The use of the HTS bearing is important to the present disclosure and allows the flywheel rotor to rotate at high velocity and take advantage of the benefits of the open-core architecture. The HTS bearing remains passively stable so long as the temperature of the HTS components remains below 80 K. The heat capacity of the HTS combined with low heat leak into the HTS results in the ability to maintain a sufficiently low temperature to keep stability and operate the bearing.

Figure 2:
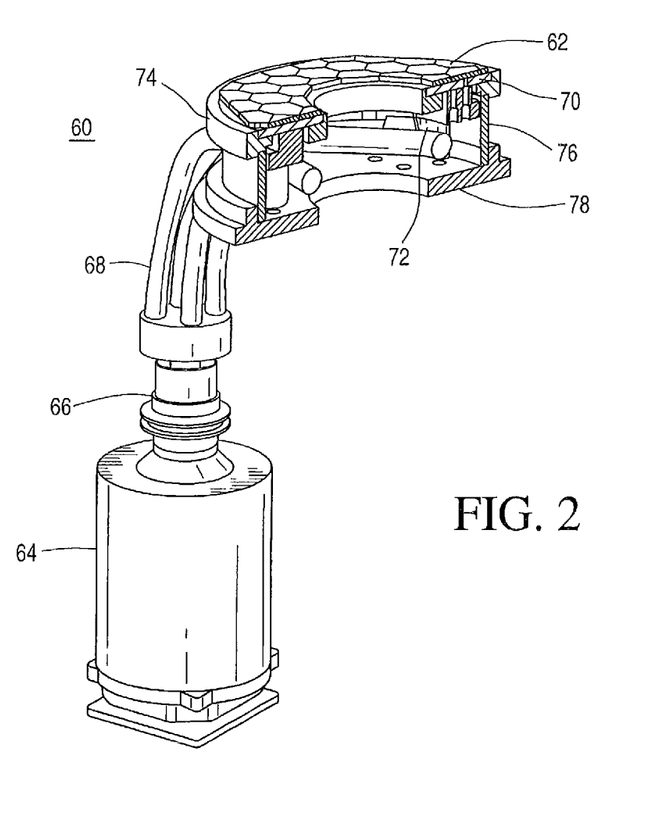
FIG. 2 is a partially exploded view of a high-temperature superconducting bearing.

In earlier known HTS bearings, the HTS elements were bathed in liquid nitrogen. Advanced HTS bearings do not require a liquid cryogen. FIG. 2 shows schematically the HTS part of the system 60 according to the present disclosure, including the cryogenic cooling. Cryocooler 64 comprises coldhead 66. Coldhead 66 connects to cables 68 that may be flexible, and that preferably act as thermal conductors at cryogenic temperature. The cables preferably comprise copper, copper alloys, aluminum, aluminum alloys, and combinations thereof, etc. Cables 68 connect to a preferably flat, thermally conducting plate 70 by means of a conducting lug 72. HTS element 62 rests on top of thermally conducting plate 70. Thermally conducting plate 70 preferably rests on, and is supported by non-thermally conducting plate 74. Lugs 72 preferably penetrate non-thermally conducting plate 74 through openings in plate 74 in one or more places, and preferably do not contact plate 74. Plate 74 is mechanically connected by a non-thermally conducting support 76 that connects to ground support 78. The cryogenic portion of the system may be covered in one or more sheets of film (not shown) having a low emissivity to reduce heat input to the system by means of radiation.

This configuration is similar to the stator component of a superconducting stability bearing used in a 5-kWh, 3-kWh flywheel assembly as reported in Materials Science and Engineering B 151 (2008) 195-198 M Strasik, J. R. Hull, P. E. Johnson, J. Mittleider, K. E. McCrary, C. R. McIver, A. C. Day, *Performance of a Conduction-cooled High-temperature Superconducting Bearing*. As indicated by the experimental bearing loss values, the presence of the copper thermal bus under the HTS elements did not significantly increase the bearing loss. The gap is the distance between the bottom of the flywheel rotor magnet and the top of the HTS crystals. A gap of from about 2 mm to about 4 mm is preferred for the HTS bearing. The rotational loss in an HTS bearing is proportional to $(\Delta B)^3/Jc$, where $\Delta B$ is the inhomogeneity of the magnetic field of the PM component measured in the rotational direction, and Jc is the critical current density in the HTS.

According to further variations of the present disclosure, for the HTS bearing to operate optimally, the stator part of the bearing preferably must be kept at cryogenic temperatures of lower than about 80 K, and more preferably from about 30 K to about 80 K. This is accomplished by establishing a flexible mechanical connection with high thermal conductance between the support base for the bulk HTS and the coldhead of a cryocooler. One preferred cryocooler contemplated for inclusion in the preferred flywheel systems of the present disclosure is the Sunpower Cryotel™ (SunPower Inc., Athens, Ohio). The preferred cryocooler is a linear, free-piston, integral Stirling-cycle machine that uses air bearings and has no friction-based failure modes, and has the ability to provide up to about 15 W of cooling at about 77 K. In addition, the preferred cryocooler has the ability to throttle input power when less cooling is required, and should provide cooling to the HTS bearing for flywheel sizes up to about 100 kWh.

According to the present disclosure, the M/G works as a conventional radial-gap brushless design in that in motor mode currents pass through the stator coils in a timed manner to interact with the magnetic field of the rotor PMs to produce torque. In generator mode, the magnetic flux of rotating PMs sweeps through the stator coils and produces voltage according to Faraday's law. At low speeds, a Hall-effect sensor measures the magnetic field from the M/G PMs to control the timing of the stator currents. At high speeds, the back electromagnetic field on the coils provides the input for this control. In a conventional radial-gap M/G, the stator coil is typically located radially outward from the PMs. However, according to preferred variations of the present disclosure, in the preferred open-core design, the locations are reversed, with the stator coils located radially inward of the PMs, as shown in FIG. 1(b).

Figure 3:
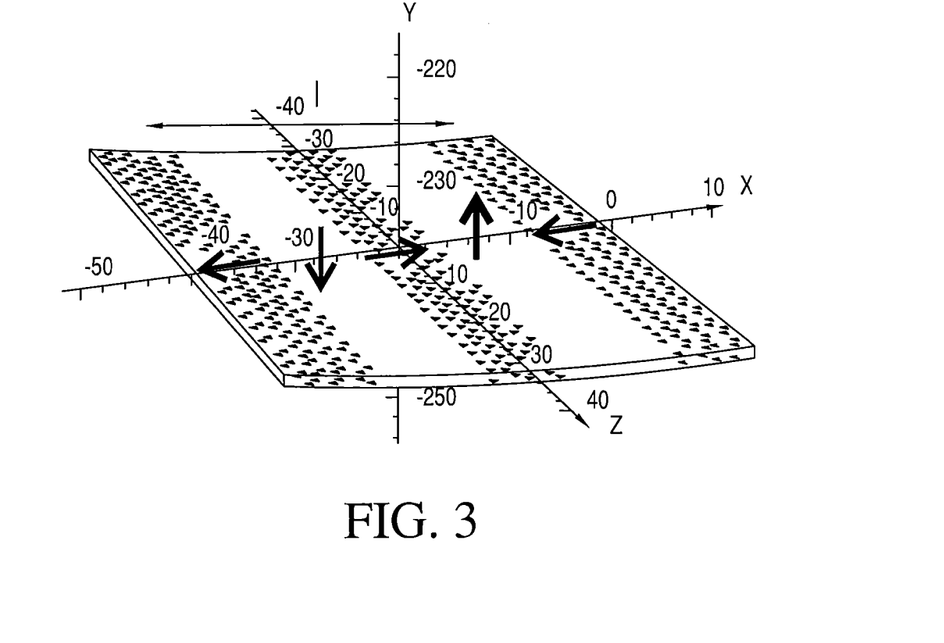
FIG. 3 is a grid showing directional magnetization of a low-order Halbach array.
Figure 4:
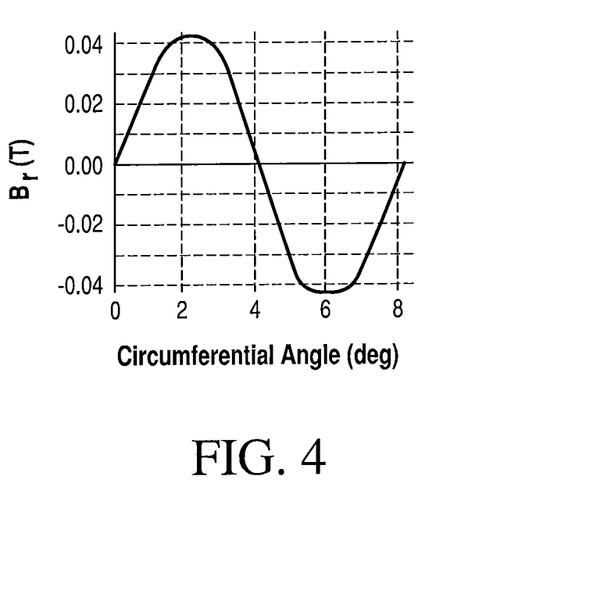
FIG. 4 is a graph showing radial magnetic field over complete pole pitch circumferential length.

According to the present disclosure, the PMs of the open-core M/G are magnetized in a low-order Halbach array, as shown in FIG. 3. The magnetization of a low-order Halbach array over a single pole length of 8 degrees is shown in the circumferential (x) direction. The value "z" represent the vertical and "y" the radial directions. The thinness of the bonded magnet shell dictates that the circumferential pole length cannot be too great without severely limiting the available flux and distorting the desired sinusoidal waveform in the stator core. The pole length is preferably greater than about 10 times the gap between the rotor PM inner radius and the stator coil outer radius. Experimental calculations for an example flywheel, shown in FIG. 4 indicate that a 90-pole machine, with a gap of about 5 mm between PMs and stator, provides sufficient flux and waveform. FIG. 4 shows a radial magnetic field over complete pole pitch μ at 5 mm radially inward from the PMs shown in FIG. 3. The preferred maximum electrical frequency for such a M/G is about 30 kHz. A stator comprising Litz wire windings without a ferromagnetic core is sufficient to provide the required power output without creating a substantial eddy current or other parasitic loss.

The high speed of the rotor and the large number of poles create a high power density. Further, for the relatively low power requirements of the flywheels made according to certain variations of the present disclosure, the radial thickness of the stator windings is relatively small, such as, for example, from about 1 mm to about 10 mm.

Figure 5:
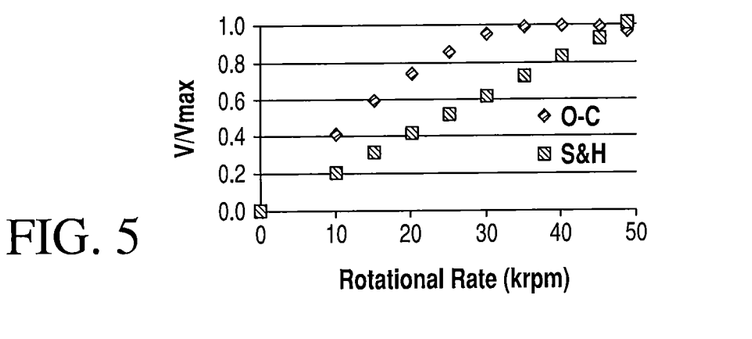
FIG. 5 is a graph comparing the rotational rates and voltages of the open-core and shaft-and-hub flywheels.

One significant advantage of the disclosed open-core flywheel architecture of the present disclosure is that rotor growth with speed significantly widens the speed range over which the power electronics can efficiently extract energy from the flywheel. According to variations of the open-core architecture, the rotor's dimension grows radially as the flywheel speed increases. In addition, as the PMs of the M/G move farther away from the stator coils, the magnetic flux through the coil diminishes. This results in a voltage that is relatively constant over the upper speed range of the flywheel. An example calculation for the outer flywheel of the design is shown in FIG. 5. The outer radius increases by about 4.2 mm in increasing speed to about 48,500 rpm. Standard power electronics can typically remove energy from the flywheel when the generator voltage is between about 0.6 to about 1.0 of the maximum design value. This limits the available energy from a shaft-and-hub flywheel to 64% of the maximum kinetic energy. As seen in FIG. 5, in the open-core design of variations of the present disclosure, 60% of the maximum voltage is available for speeds greater than about 15,000 rpm, and over 90% of the maximum kinetic energy is available for the load. In the example shown in FIG. 5, the maximum voltage occurs at about 40,000 rpm, and decreases slightly at speed in excess of about 40,000 rpm.

Figure 6:
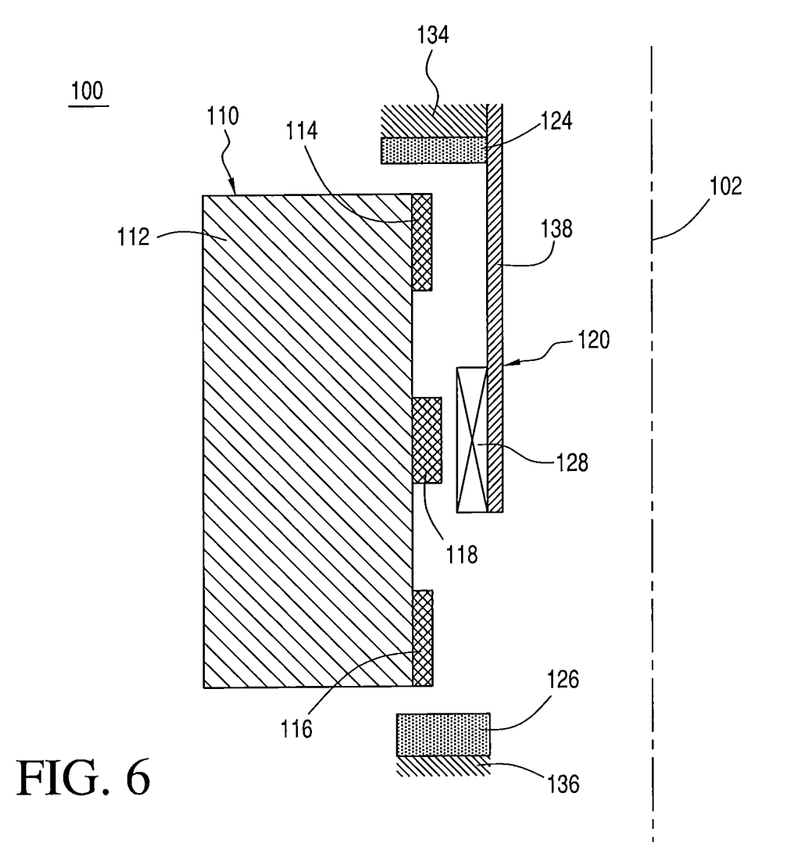
FIG. 6 is a close-up cross-sectional view of an alternate flywheel assembly shown in FIG. 1(b)

FIG. 6 shows an open-core flywheel 100 concentric about a centerline 102. The flywheel comprises rotor 110 and stator 120. Rotor 110 preferably comprises a fiber-composite rim 112, an upper stability bearing permanent magnet (PM) 114, a lower stability permanent magnet PM 116, and a motor/generator permanent magnet (PM) array 118. The stator 120 comprises an upper stability bearing HTS array 124, a lower stability bearing HTS array 126, a stator coil assembly 128, and mechanical supports 134, 136 and 138. Mechanical support 134 supports the upper stability bearing HTS 124. Mechanical support 136 supports lower stability bearing HTS array 126. Mechanical support 138 supports stator coil assembly 128. The mechanical supports 134, 136 and 138 are fixedly attached to a vacuum chamber (not shown) that surrounds flywheel assembly 100. It is understood that while supports 134 and 138 are shown immediately adjacent to one another, such supports may be spaced a desired distance from one another. Flywheel rotor 110 is magnetically levitated via the magnetic bearing components, including the upper stability bearing (comprising rotor PM 114 and stator HTS 124), and the lower stability bearing (comprising rotor PM 116 and lower stator HTS array 126). Rotational acceleration of rotor 110 about centerline 102 is achieved by the electromagnetic interaction between the rotor PM 118 and the stator coil 128. Mechanical support 136 thermally insulates the HTS array 126 from the ground. There is also typically a thermally conducting structure (not shown) located between the HTS array 126 and thermally insulating structure 136 that connects HTS array 126 to a cold source, e.g. a cryocooler, etc. as shown in FIG. 2.

Similarly, mechanical support 134 thermally insulates the HTS 124 from the ground, and there is typically a thermally conducting structure (not shown) positioned between HTS 124 and support 134 that connects HTS 124 to a cold source.

Figure 7:
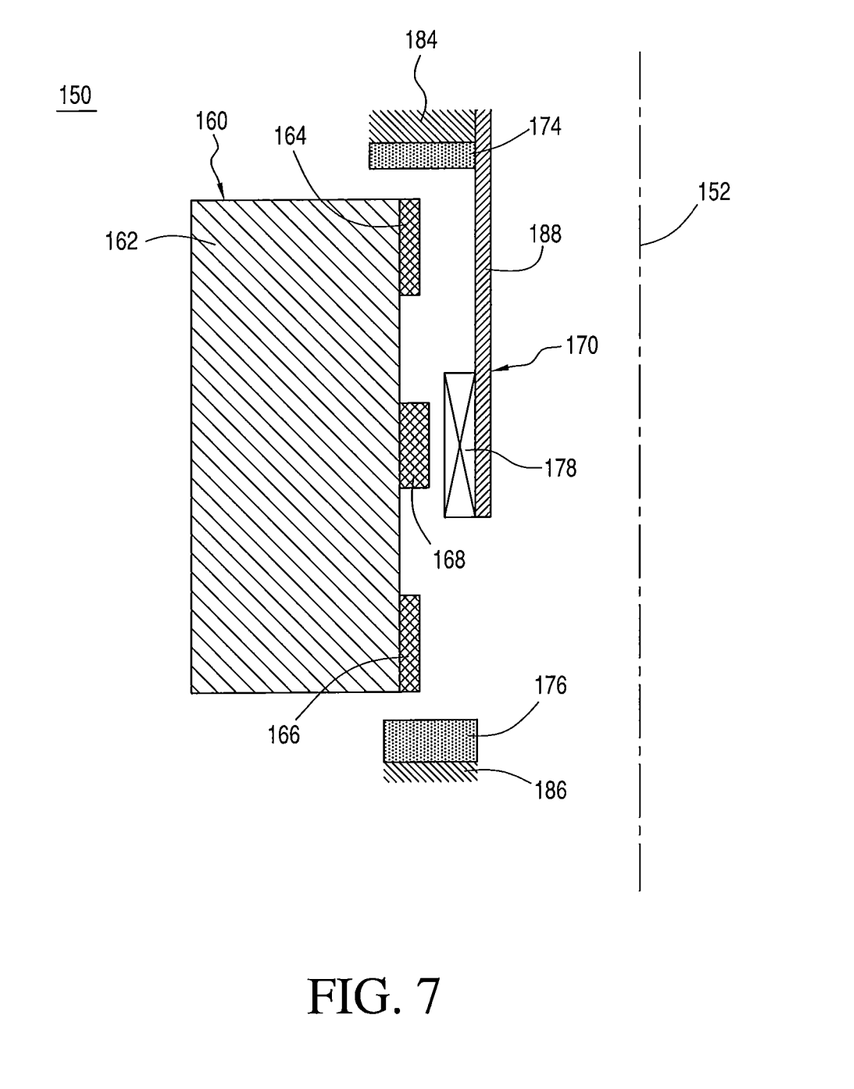
FIG. 7 is a close-up cross-sectional view of the flywheel assembly shown in FIG. 1(b)

FIG. 7 shows a further variation where the open-core flywheel 150 is concentric about a centerline 152. The flywheel comprises rotor 160 and stator 170. Rotor 160 comprises a fiber-composite rim 162, lift bearing PM 164, stability PM 166, and a motor/generator PM array 168. The stator 170 comprises a lift bearing PM 174, a HTS assembly 176, a stator coil assembly 178, and mechanical supports 184, 186 and 188. Mechanical support 184 supports stator lift bearing PM 174. Mechanical support 186 supports HTS array 176. Mechanical support 188 supports stator coil assembly 178. The mechanical supports 184, 186 and 188 are fixedly attached to a vacuum chamber (not shown) that preferably surrounds flywheel assembly 150. Flywheel rotor 160 is magnetically levitated via the magnetic bearing components, including the lift bearing (comprising rotor PM 164 and stator PM 174), and the stability bearing (comprising rotor PM 166 and stator HTS 176. Rotational acceleration of rotor 160 about centerline 152 is achieved by the electromagnetic interaction between the rotor PM 168 and the stator coil 178. Mechanical support 186 thermally insulates the HTS array 176 from the ground. There is also typically a thermally conducting structure (not shown) positioned between the HTS bearing assembly 176 and thermally insulating structure 186 that connects HTS 176 to a cold source, such as, for example, a cryocooler, etc., as shown in FIG. 2.

A number of configurations are contemplated by regarding the lift bearing in the novel open-core flywheel assemblies. FIG. 8 is directed to one variation showing an upper portion of the flywheel assembly. PM 204 is attached to the upper part of composite rim 202. Stator PM 206 is located vertically above PM 204, and is attached to mechanical support 208. The black arrows in FIG. 8(a) designate the preferred direction of magnetization. In this example, there is an attractive force upward on PM 204 that helps lift the rotor 202 against the force of gravity. The stator PM 206 is sufficiently wide such that the attractive force is nearly uniform as the rotor composite rim 202 grows outward radially.

Figure 8A:
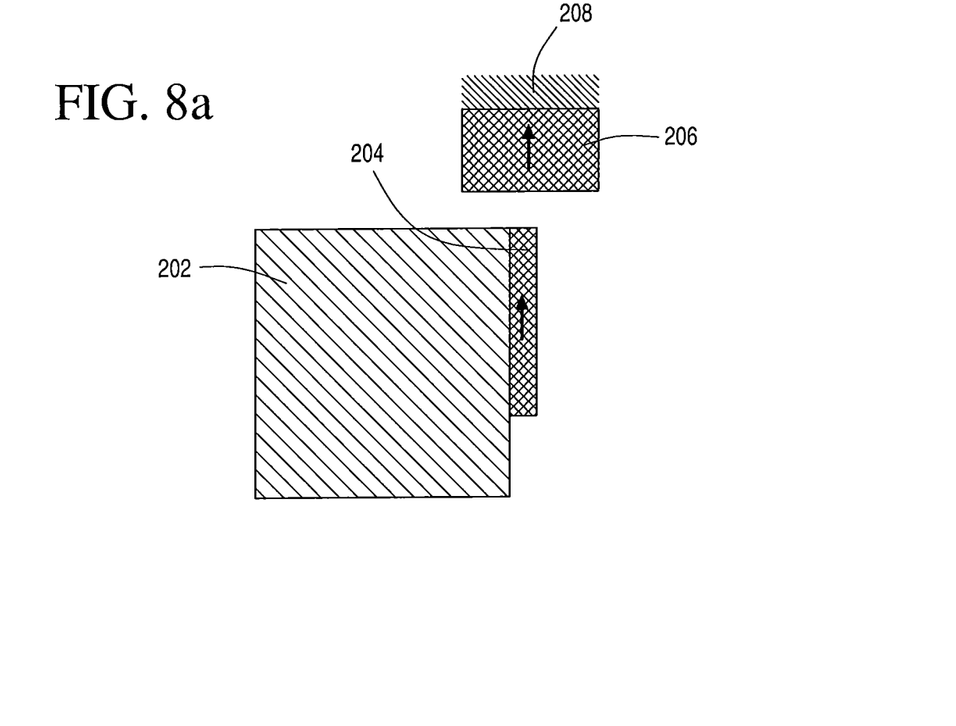
FIGS. 8(a)-8(e) and 9(a) and 9(b) are close-up cross-sectional views of various bearing configurations and magnetizations.
Figure 8B:
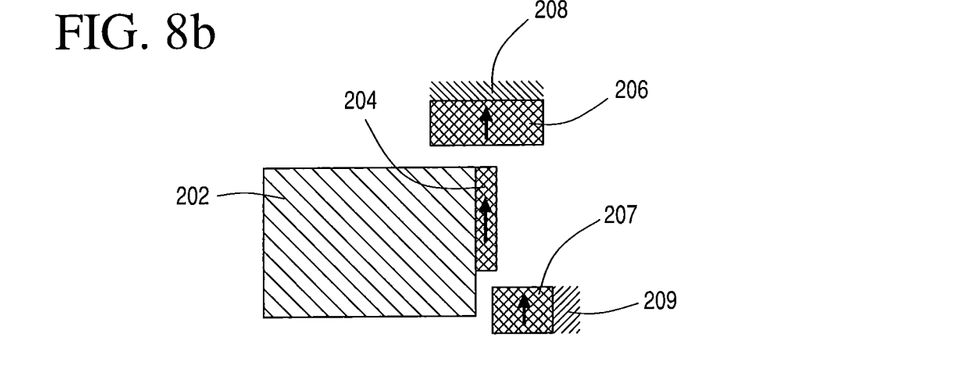
Figure 8C:
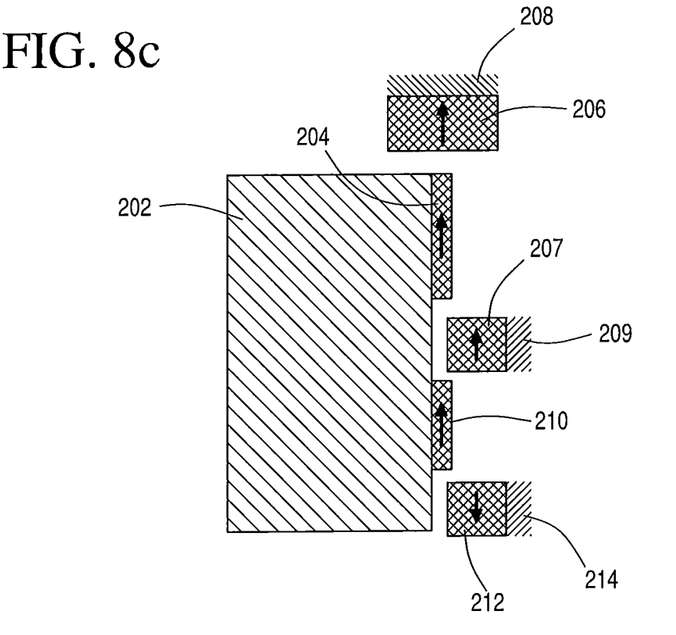

An alternative lift bearing is shown in FIG. 8(b), showing a second stator PM 207 located below and radially inward from rotor PM 204. The magnetic force in this case is repelling, and the location of the stator PM 207 below the rotor PM 204 preferably provides an additional upward force on the rotor 202. It is understood that additional magnets may be added to increase the force as indicated in FIG. 8(c). In this instance, there is an additional attractive force with resulting additional upward force on rotor 202, between the interactions of stator PM 207 and rotor PM 210. There is also an additional repulsive force, with resulting upward force on the rotor, between the interactions of rotor PM 210 and stator PM 212.

Figure 8D:
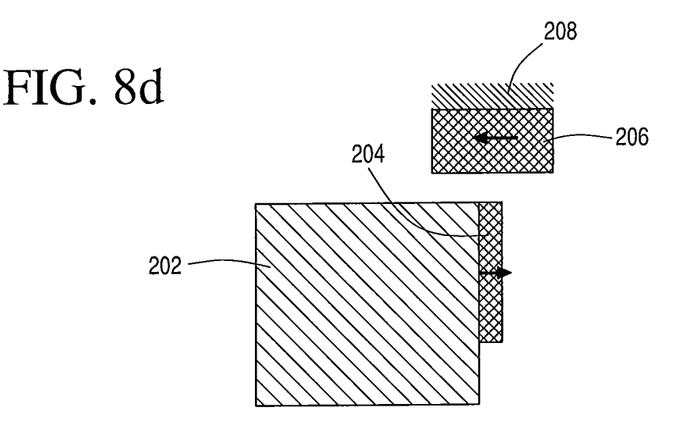
Figure 8E:
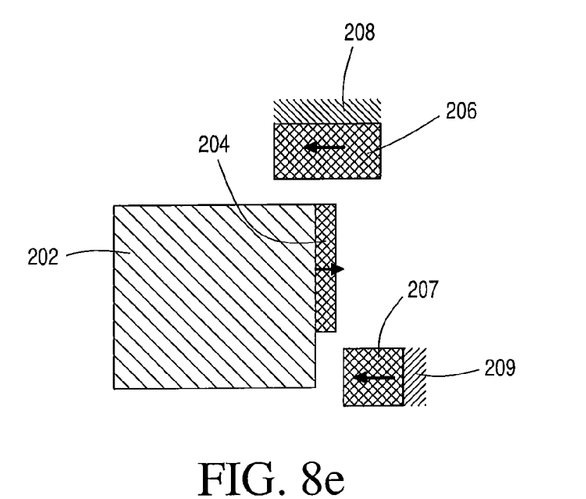

As shown in FIG. 8(d) additional variations presently disclosed contemplate magnetizations that are not vertical, e.g. radial magnetization, etc. FIG. 8(e) shows additional PM 207 attached to mechanical support 209.

Figure 9A:
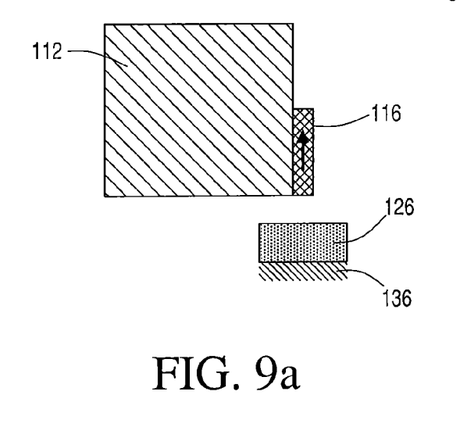
Figure 9B:
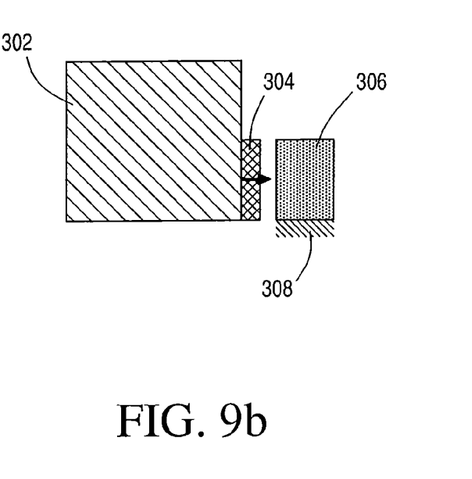

Further, the present disclosure contemplates orienting the stability bearing into different arrangements. FIG. 9(a) shows the magnetization of PM 116 as it would exist in FIG. 6. In FIG. 9(b), an alternative shows HTS 306 located radially inward from the stability bearing PM 304. In this orientation, PM 304 is magnetized in the radial direction.

While FIG. 9(b) shows the magnetization direction as radially inward, it is understood that such magnetization could be directed radially outward.

In addition, FIG. 6 shows a further alternative where the lift bearing is replaced by a second stability bearing. The motor/generator PM 118 shown in FIG. 6, and discussed relative to FIGS. 3-5, shows magnetizations that are radial, circumferential, or a combination of the two. FIG. 9 shows a further contemplated variation directed to an arrangement where the motor/generator PM has vertical magnetizations that alternate direction about the circumference.

Figure 10:
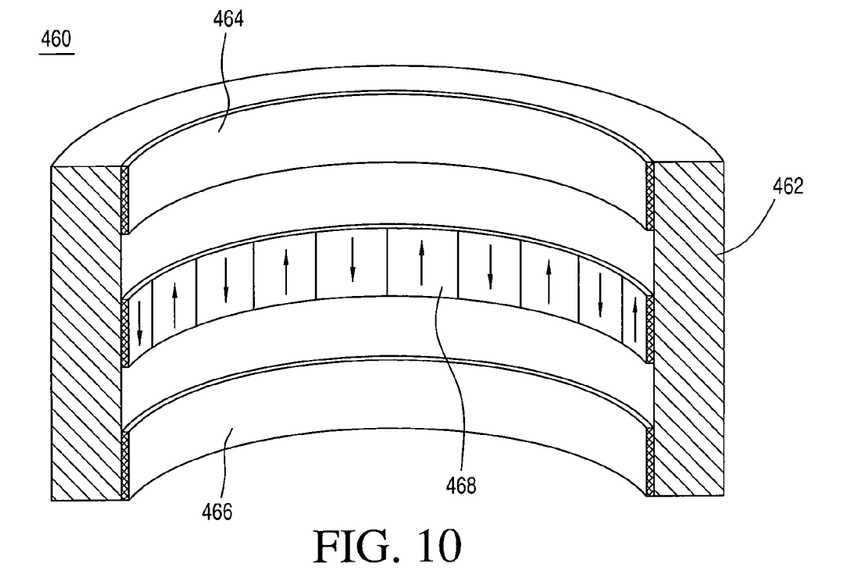
FIG. 10 is a cut-away view of a variation of the present disclosure showing an inner surface of a rotor showing PMs with direction of magnetization.

In FIG. 10, the rotor 460 of an open-core flywheel assembly preferably comprises a fiber composite rim 462, an upper PM 464, a lower PM 466 and a PM ring 468. It is understood that rotor 460 is substantially cylindrical, and that PMs 464, 466 and 468 are understood to preferably extend about the entire circumference of the inner surface of rotor rim 462. Centrally positioned PM 468 is shown magnetized according to the arrows, with the direction of magnetization alternating in the vertical upward or downward direction.

Figure 11:
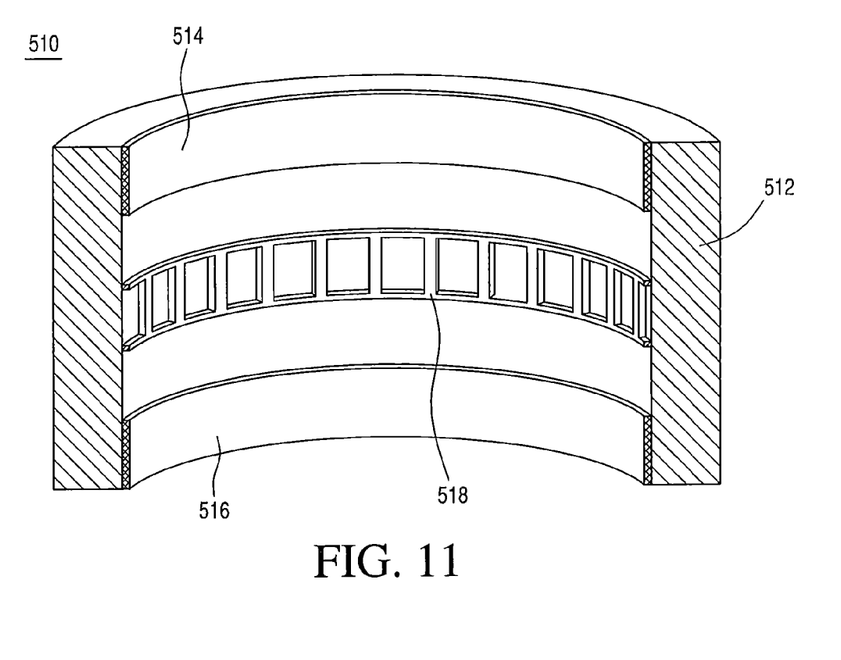
FIG. 11 is a cut-away view of a variation of the present disclosure showing an inner surface of a rotor showing PMs and a copper conductor.

FIG. 11 shows an alternate variation for a rotor of the present disclosure. Rotor 510 of an open-core flywheel assembly preferably comprises a fiber composite rim 512, an upper PM 514, a lower PM 516 and a ladder-shaped copper conductor 518. It is understood that rotor rim 512 is substantially cylindrical, and that PMs 514, 516 and 518 are understood to preferably extend about the entire circumference of the inner surface of rotor rim 512. In this variation, the motor/generator function is preferably performed with an induction motor topology.

According to the present, disclosure, incorporating into an open-core flywheel architecture, rotor materials having significantly improved strength/density ratios, including preferred MWCNTs will increase flywheel rotor energy densities from presently known values of about 264 Wh/kg to at least about 473 Wh/kg, and a commensurate increase of and fiber tensile strength of from about 11 to about 63 GPa (an increase in efficiency and strength of at least about 80% from known devices). Indeed, when wall thickness of the MWCNTs is normalized to about 0.075 nm, theoretical wall strengths of at least about 300 GPa are achievable. It is further understood that single-walled CNTs (SWCNTs) are also contemplated by the present disclosure and may be incorporated into the rotor components of the inventive flywheel assemblies presented herein, since SWCNTs may provide adequate or even superior mass efficient reinforcement. A typical SWCNT has a diameter of about 1.35 nm. Using this diameter with a 1 atom interatomic spacing Vfs of only 39% are achievable. A diameter of 3 nm would yield Vfs of 60%. It is understood that the optimal CNTs for use in connection with variations of the present disclosure balance CNT diameter, achievable Vf, and efficiency of the CNT reinforcement.

According to preferred variations of the present disclosure, most of the flywheel rotor comprises a filament-wound fiber composite that is magnetically levitated by a HTS bearing. The HTS bearing comprises a PM rotor and HTS stator. Because of the superconducting properties of the HTS stator, the levitation is passive, requiring no significant feedback or active controls. The HTS stator preferably comprises an array of individual HTS crystals of Y—Ba—Cu—O, or other materials where Y is replaced by other rare earth elements such as, for example, Gd, Nd, Eu, etc., that are cooled by thermal conduction to the coldhead of a cryocooler to a temperature of from about 70 K to about 80 K. Preferably no cryogenic fluids (for example, liquid nitrogen, etc.) are required for bearing operation. The brushless M/G comprises a PM rotor and a stator preferably comprising copper windings in a ferromagnetic yoke. M/G stator cooling is accomplished by thermal conduction to the vacuum chamber walls. No parasitic energy is required for this function. An energy-absorbing containment liner is placed between the rotating flywheel and the outer vacuum shell. It is preferred to keep the weight of both the vacuum chamber, and the stationary components inside the vacuum chamber to a minimum to meet the energy density requirements of the flywheel array. Other major components of the preferred system include a lift bearing, a touchdown bearing, and power electronics.

While the preferred variations and alternatives have been illustrated and described, it will be appreciated that various changes and substitutions can be made therein without departing from the spirit and scope of the disclosure. Accordingly, the scope of the disclosure should only be limited by the accompanying claims and equivalents thereof.

We claim:

1. An open core architecture flywheel assembly for storing and releasing energy comprising:
   a hollow substantially cylindrical rotor assembly comprising a rotor rim having an inner and outer surface;
   a brushless motor/generator permanent magnet array comprising:
      a stator assembly in close proximity with the rotor assembly comprising a rotor rim;
      at least one flexible rotor magnet affixed to the inner surface of the rotor rim;
      at least one stator magnet affixed to the stator, said stator magnet dimensioned wider than the at least one flexible rotor magnet to establish an attractive force at rest and
      a high temperature superconducting bearing;
   wherein the at least one flexible rotor magnet and stator magnet are positioned relative to one another to facilitate levitation of the rotor during operation; and
   wherein the attractive force at rest is nearly uniform to an attractive force as the rotor rim grows outward radially when the rotor assembly is operating at circumferential velocities of from about 300 m/s to about 3000 m/s.

2. The flywheel assembly of claim 1, wherein the rotor comprises a material selected from the group consisting of carbon-fiber-containing material, glass-fiber containing material, metal-containing-material and combinations thereof.

3. The flywheel assembly of claim 2, wherein the material comprises a matrix of materials selected from the group consisting of: graphite, e-glass, S-glass, silica, aluminum, titanium, steel, and combinations thereof.

4. The flywheel assembly of claim 2, wherein the carbon-fiber-containing material is a carbon nanotube-containing material comprising a multi-walled carbon nanotube-containing material.

5. A vehicle comprising the flywheel assembly of claim 1.

6. A method for storing energy in an open core architecture flywheel assembly for subsequent release upon demand comprising the steps of:
   providing a hollow substantially cylindrical rotor assembly comprising a rotor rim having an inner and outer surface;
   providing a brushless motor/generator permanent magnet array comprising;
   a stator assembly in close proximity with the rotor rim;
   at least one flexible rotor magnet to the inner surface of the rotor rim; and affixing at least one stator magnet to the stator, said stator magnet dimensioned wider than the at least one flexible rotor magnet to establish an attractive force at rest and said stator magnet dimensioned to a predetermined width wider than the at least one flexible rotor magnet to substantially maintain the attractive force with the rotor nearly uniformly as the rotor grows outward radially when the rotor is operating at circumferential velocities of from about 300 m/s to about 3000 m/s; and providing a high temperature superconducting bearing in contact with a cooling source;

wherein the at least one flexible rotor magnet and stator magnet are positioned relative to one another to facilitate levitation of the rotor during operation.

7. The method of claim 6, wherein the rotor comprises a material selected from the group consisting of carbon-fiber-containing material, glass-fiber containing material, metal-containing-material and combinations thereof.

8. The method of claim 7, wherein the material comprises a matrix of materials selected from the group consisting of: graphite, e-glass, S-glass, silica, aluminum, titanium, steel, and combinations thereof.

9. The method of claim 7, wherein the carbon-fiber-containing material is a multi-walled carbon nanotube-containing material.

* * * * *